(12) United States Patent
Hyun

(10) Patent No.: US 9,248,822 B2
(45) Date of Patent: Feb. 2, 2016

(54) CONTROL APPARATUS AND METHOD FOR REGENERATIVE BRAKING OF ECO-FRIENDLY VEHICLE

(71) Applicant: Hyundai Motor Company, Seoul (KR)

(72) Inventor: Baro Hyun, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 53 days.

(21) Appl. No.: 14/107,532

(22) Filed: Dec. 16, 2013

(65) Prior Publication Data

US 2015/0006039 A1 Jan. 1, 2015

(30) Foreign Application Priority Data

Jun. 27, 2013 (KR) .................. 10-2013-0074955

(51) Int. Cl.
*B60L 7/10* (2006.01)
*B60G 17/0195* (2006.01)
*B60W 10/192* (2012.01)
*B60W 10/11* (2012.01)

(52) U.S. Cl.
CPC ............ *B60W 10/192* (2013.01); *B60W 10/11* (2013.01)

(58) Field of Classification Search
CPC .......... B60L 7/10; B60T 8/172; B60T 13/74; B60G 17/0195
See application file for complete search history.

(56) References Cited

U.S. PATENT DOCUMENTS

| | | | |
|---|---|---|---|
| 5,024,489 A * | 6/1991 | Tanaka et al. | 303/3 |
| 5,915,801 A * | 6/1999 | Taga et al. | 303/152 |
| 2011/0144880 A1* | 6/2011 | Enjolras | 701/70 |
| 2012/0144947 A1* | 6/2012 | Herbert et al. | 74/473.31 |

FOREIGN PATENT DOCUMENTS

| | | |
|---|---|---|
| JP | 2009-143501 A | 7/2009 |
| JP | 2013-052795 A | 3/2013 |
| KR | 10-1997-0036327 | 7/1997 |
| KR | 10-1998-013781 | 5/1998 |
| KR | 10-2013-0030507 | 3/2013 |

* cited by examiner

*Primary Examiner* — Helal A Algahaim
*Assistant Examiner* — Michael Fouche
(74) *Attorney, Agent, or Firm* — Mintz Levin Cohn Ferris Glovsky and Popeo, P.C.; Peter F. Corless

(57) ABSTRACT

A variable control apparatus and method of the amount of regenerative braking of a vehicle using a paddle shift are provided. The method includes sensing, by a controller, positive (+) and negative (-) shifting in a manual mode based on a signal from a shift-operating unit during regenerative braking with a drive (D) gear engaged while the vehicle travels. A regenerative braking torque map that corresponds to a selected gear is selected based on the signal from the shift-operating unit. In addition, regenerative braking of a driving motor is adjusted based on the torque value calculated from the selected regenerative braking torque map.

9 Claims, 2 Drawing Sheets

CONTROL APPARATUS AND METHOD FOR REGENERATIVE BRAKING OF ECO-FRIENDLY VEHICLE

CROSS-REFERENCE TO RELATED APPLICATION

This application claims under 35 U.S.C. §119(a) the benefit of Korean Patent Application No. 10-2013-0074955 filed Jun. 27, 2013, the entire contents of which are incorporated herein by reference.

BACKGROUND (a) Technical Field

The present disclosure relates to a method of controlling regenerative braking of an eco-friendly vehicle, and more particularly, to an apparatus and a method which variably controls the amount of regenerative braking based on shifting from a drive gear by a driver while driving.

(b) Background Art

Currently, internal combustion engine vehicles that use fossil fuel such as gasoline or diesel have problems including environmental contamination caused by exhaust gases, global warming by carbon dioxide, and respiratory diseases due to generation of ozone. Accordingly, eco-friendly vehicles such as an Electric Vehicle (EV) that runs by operating an electric motor, an Hydraulic Electric vehicle (HEV) that runs using an engine and an electric motor, and a Fuel Cell Electric Vehicle (FCEV) that runs by operating an electric motor, using power generated by a fuel cell have been developed.

As known in the art, eco-friendly vehicles run a regenerative braking (RB) mode that collects braking or inertia energy through electricity generation of an electric motor and charge a battery with the energy during braking or coasting by inertia of the vehicles. Since the eco-friendly vehicles collect energy, using an electric motor (e.g., driving motor) and charge a battery during braking or coasting by inertia, fuel efficiency may be improved and energy may be used more efficiently. On the other hand, one regenerative torque map is set for the drive (D) gear in eco-friendly vehicles of the related art, to obtain a constant amount of regenerative braking energy during coasting with the D-gear engaged, due to the regenerative braking torque map.

Obtainable optimum regenerative braking energy depends on the features of roads, and accordingly, the optimum regenerative braking energy may not be achieved only by the D-gear according to the known techniques. For example, more regenerative braking energy may be obtained on a steep slope compared to a gentle slope (e.g., a less inclined road) and the optimum regenerative braking energy may not be obtained only by the D-gear according to the known techniques, in regenerative braking with the shift lever at the D-gear.

Although substantial energy may be recovered in some gears compared to the D-gear, such as, an E-gear (e.g., an eco-gear used for driving in an economical mode) or a B-gear (e.g., used with an engine brake operating) with different torque maps, most drivers do not use the gears since it is cumbersome to operate the shift lever while driving. In particular, when the B-gear is used for deceleration, it may be possible to obtain large regenerative braking energy, but it may be difficult to use the gear frequently since the feeling of deceleration of a vehicle is substantial when the gear used for all of road conditions to recover substantial energy.

The above information disclosed in this section is only for enhancement of understanding of the background of the invention and therefore it may contain information that does not form the prior art that is already known in this country to a person of ordinary skill in the art.

SUMMARY

The present invention provides a variable control apparatus and method of the amount of regenerative braking for an eco-friendly vehicle which may obtain the optimum regenerative energy during driving with the D-gear engaged, and may improve fuel efficiency of the vehicle and use energy more effectively by increasing the amount of energy recovered during driving, with convenient operation by a driver.

In order to achieve the object, the present invention provides a variable control method of the amount of regenerative braking of an eco-friendly vehicle, which provides a plurality of regenerative braking torque maps divided for gears (e.g., D0~DN) in a manual mode and may include: sensing positive (+) and negative (-) shifting (e.g., shift-up/shift-down) by a driver in a manual mode from a signal transmitted from a shift-operating unit in regenerative braking with a D-gear engaged while a vehicle travels; selecting the regenerative braking torque map that corresponds to the selected gear in the gears D0~DN from the signal transmitted from the shift-operating unit; and executing regenerative braking of a driving motor based on the torque value calculated from the selected regenerative braking torque map.

Further, the present invention provides a variable control apparatus of the amount of regenerative braking of an eco-friendly vehicle, which may include: a shift-operating unit configured to perform positive (+) and negative (-) shifting (shift-up/shift-down) in a manual mode with a D-gear engaged while a vehicle travels; an upper controller configured to sense shifting by a driver in a manual mode by receiving a signal transmitted from the shift-operating unit during regenerative braking, select the regenerative braking torque map that corresponds to the selected gear, and calculate a regenerative braking torque value from the selected regenerative braking torque map; and a motor controller configured to receive a torque order that corresponds to the calculated regenerative braking torque value from the upper controller and executes regenerative braking torque output of a driving motor, in which a plurality of regenerative braking torque maps divided for gears (D0~DN, N≥2) in a manual mode are provided and the regenerative braking torque map that corresponds to the gear selected by a driver may be selectively used to calculate the regenerative braking torque value.

Further, in an exemplary embodiment of the present invention, as the gear increases (e.g., a higher gear), the regenerative braking torque value may increase according to the vehicle speed in the regenerative braking torque maps and the shift-operating unit may be a paddle shift on a steering wheel. Therefore, according to the variable control apparatus and method of the amount of generative braking of the present invention, since the regenerative braking torque maps for the gears (D0~DN-gears) may be selected or changed based on operation of the paddle shift on the steering wheel, with the shift lever at the D-gear while a vehicle travels, subdivided and different regenerative braking control may be performed at the D-gear (e.g., the amount of generative braking may change for each gear), such that it may be possible to achieve the optimum regenerative braking energy. Accordingly, it may be possible to increase the amount of recovered energy, improve fuel efficiency, and use the energy of a vehicle more effectively.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
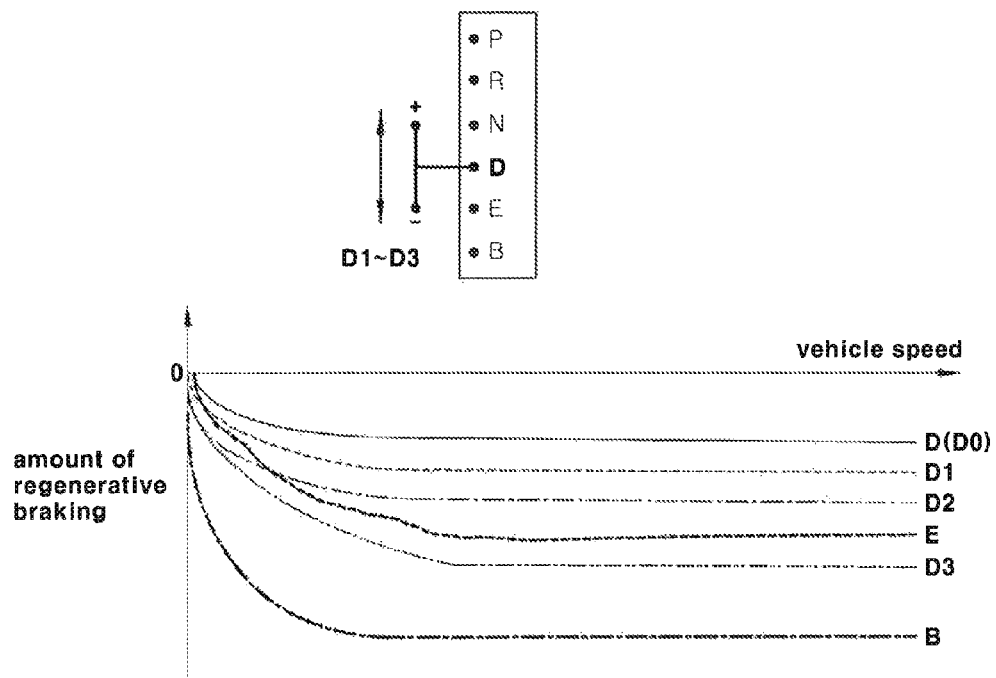
FIG. 1 is an exemplary diagram showing regenerative braking torque maps for the gears of a vehicle according to an exemplary embodiment of the present invention.

| 10: steering wheel | 11: paddle shift |
| 12: positive (+) operation unit | 13: negative (−) operation unit |
| 20: vehicle controller | 30: motor controller |
| 31: inverter | 32: driving motor |

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the accompanying claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, the present invention will be described more fully with reference to the accompanying drawings for those skilled in the art to easily implement the present invention.

The present invention provides variable control apparatus and method of the amount of regenerative braking for an eco-friendly vehicle which may obtain the improve regenerative energy while driving with the D-gear engaged, and improve fuel efficiency of the vehicle and use energy more efficiently by increasing the amount of energy recovered while driving, with convenient operation by a driver.

Accordingly, a regenerative braking torque map with a D-gear divided in segments (e.g., torque maps set for D0, D1, D2, and D3) which may change based on shifting to + and − by a driver may be provided and a gear mounted on a steering wheel may be used for convenient operation by the driver. Torque maps for gears of the related art are not practically useful for maximizing regenerative braking energy, such that more number of subdivided torque maps, as compared with the torque maps divided only in D-gear, E-gear, and B-gear in the related art, are set in the present invention to improve the use of torque maps.

In particular, in the present invention, a plurality of additional regenerative braking torque maps divided into D0~DN (N≥2, for example, D0, D1, D2, and D3) for the D-gear for which only one regenerative braking torque map was provided, other than the E-gear and the B-gear, and in the present invention when a driver shifts to D0~DN in a manual mode from D-gear, as needed, while driving, the amount of regenerative braking may be variably adjusted based on the torque map that corresponds to the selected gear. Further, in consideration that it may be difficult to shift with the shift lever while driving in the related art, selection and change of the regenerative braking torque maps by shifting may be performed in response to signals by the operation of the gear (e.g., + shift-up (gear-up) in D, −: shift-down gear-down)).

FIG. 1 is an exemplary diagram showing a regenerative braking torque maps for the gears in a vehicle in an exemplary embodiment of the present invention, which shows an example of gears that may be shifted when a driver operates a shift lever within a vehicle and shows an example of regenerative braking torque maps set in advance for the gears.

In common vehicles, a driver may select P (parking), R (rear), N (neutral), D (drive), + (gear up), and − (gear down) with a shift lever and the operated automatic gear may be shown by a gear display system. Further, in some vehicles, a paddle switch (e.g., indicated by '+/−' or 'up/down') may be mounted on the steering wheel as a shift-operating unit for operation in a manual mode of an automatic transmission.

In the present invention, the paddle switch may be used for variably controlling the amount of regenerative braking for the gears and a controller may be configured to use the signals from the paddle switch (e.g., + and − signals), which are signals that show the driver's intention, as input signals for selection and change of the torque maps and variable control of the amount of regenerative braking. In addition, the regenerative braking torque map for a manual mode at the D-gear may be subdivided into a plurality of maps to allow different regenerative braking torque maps to be applied based on the operations (e.g., + (shift-up) and − (shift-down)) of the D-gear. FIG. 1 shows additional regenerative braking torque maps for the D1-, D2-, and D3-gears that may be selected in response to signals generated by the operation of the paddle switch, other than the D-gear (D0-gear), B-gear, and E-gear provided in the related art.

As shown in FIG. 1, the regenerative braking torque maps may be maps that define the amount of regenerative braking torque based on the vehicle speed to adjust the regenerative braking torque of a driving motor, in which the amount of torque of the D1-, D2-, and D-3 gears may be set greater than the regenerative braking torque map of the D0-gear and less than the amount of torque of the B-gear. Further, the amount of torque of the D1- and D2-gears may be set less than that of the E-gear and the amount of torque of the D3-gear may be set greater than that of the E-gear and less than that of the B-gear e.g., for D3-gear, 2/3 of the B-gear).

The torque maps are merely example for explaining the present invention, the present invention is not limited to the example shown in FIG. 1, the amount of torque based on the vehicle speed may be set in various ways within the torque maps, and the present invention is not limited to addition of three torque maps for D1, D2, and D3, as shown in the figure. In other words, more torque maps, for example, torque maps with different torque based on the vehicle speed, for example, at D1-, D2-, D3-, and D4-gears may be set, and the number of torque maps may depend on the number of gears in the D-gear manual mode in the vehicle.

Figure 2:
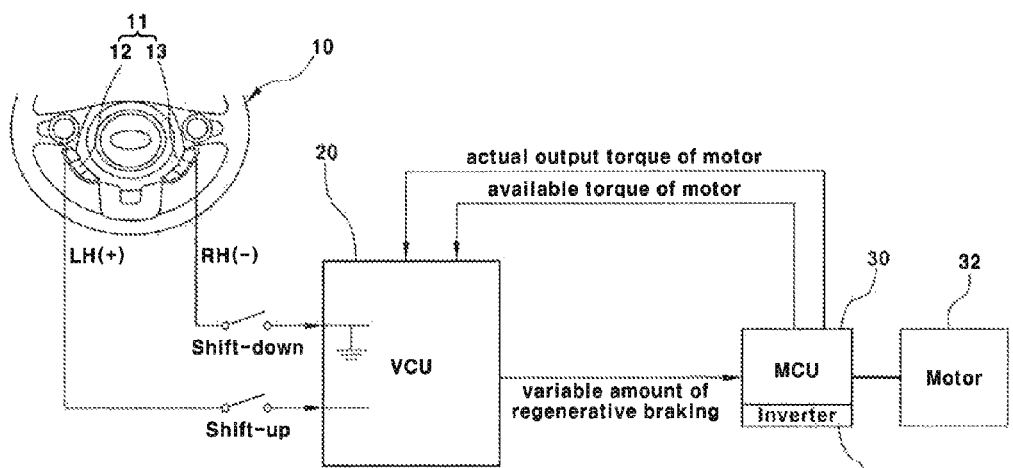
FIG. 2 is an exemplary diagram showing a variable control apparatus of the amount of regenerative braking according to an exemplary embodiment of the present invention.

FIG. 2 is an exemplary diagram illustrating the configuration of a variable control apparatus of the amount of regenerative braking according to the present invention, showing a configuration that may use a gear 11 mounted on a steering wheel 10 as a shift-operating unit to change torque maps. In the configuration shown in the figure, when a driver operates a positive (+) operation unit 12 or a negative (−) operation unit 13 of the gear 11 for manual mode operation, a vehicle controller (VCU) 20, which may be an upper controller, may be configured to receive signal from the paddle switch and the regenerative braking torque map of the operated gear may be selected and used.

The vehicle controller 20 may be configured to calculate a motor torque value based on the selected regenerative braking torque map, and a motor controller (MCU) 30 may be configured to receive a torque order that corresponds to the calculated torque value, and then the motor controller 30 may be configured to adjust the regenerative braking torque output of a driving motor 32 based on the torque order value. Since the process of adjusting the regenerative braking of the driving motor 32 based on calculated torque values, using controllers in a vehicle such as the VCU 20 and the MCU 30, is well known in the art, the detailed description is not provided herein. In addition, in the present invention, a driver may operate the positive (+) and negative (−) (e.g., up and down) operation units 12 and 13 on the steering wheel 10 to shift to the D0-~DN-gears from the D-gear while driving. In particular, the driver may operate the positive (+) operation unit 12 to shift up and the negative (−) operation unit 13 to shift down.

Figure 3:
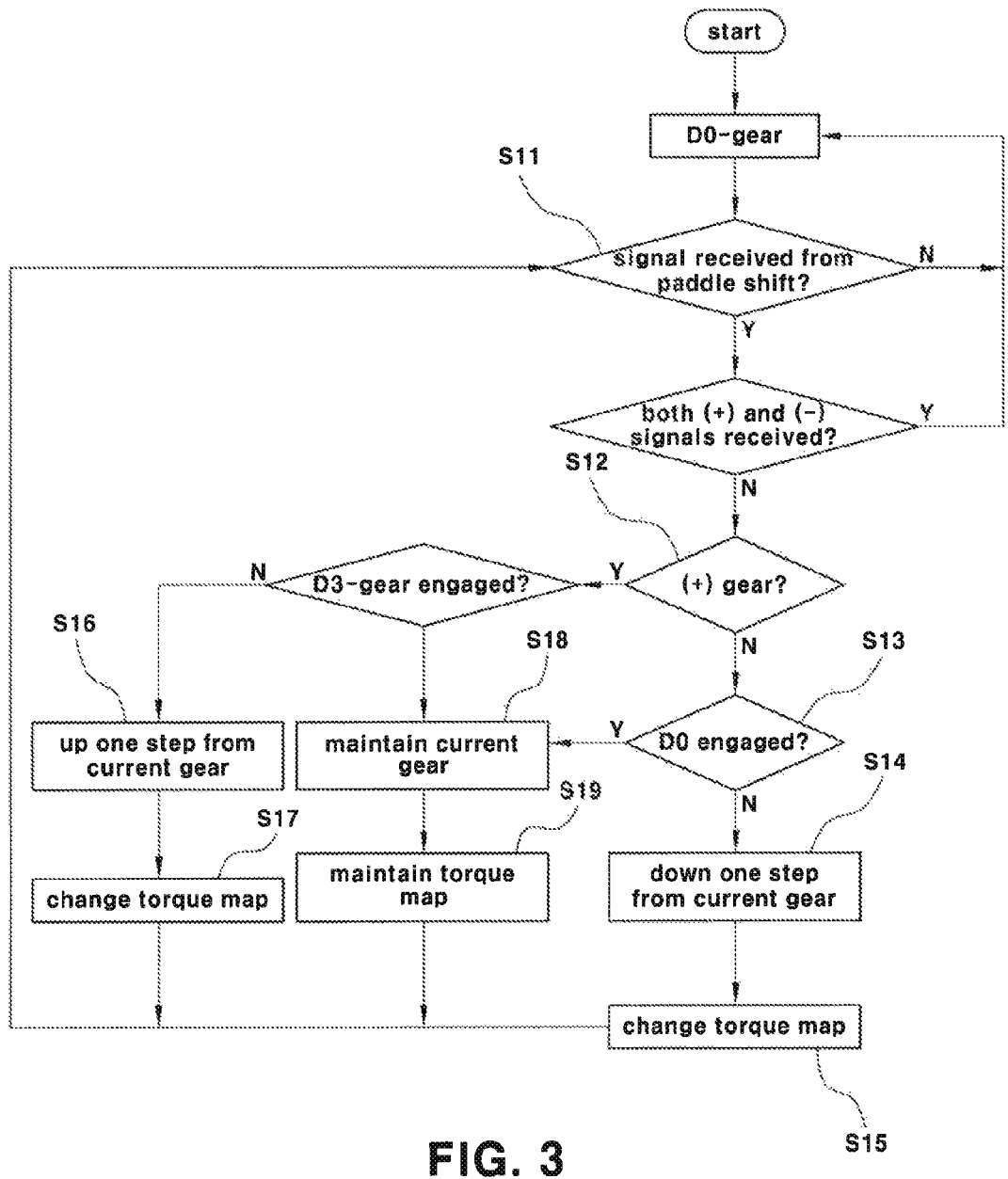
FIG. 3 is an exemplary flowchart illustrating a process of control according to an exemplary embodiment of the present invention.

FIG. 3 is an exemplary flowchart illustrating a control method according to an exemplary embodiment of the present invention, showing an operation of selecting and changing torque maps based on the operation of the paddle switch. As shown in the figure, when the paddle switch 11 is operated, the vehicle controller 20 may be configured to receive a signal from the paddle switch, more accurately, a signal by the positive (+) or negative (−) operation of the paddle switch (S11).

With the positive (+) or negative (−) operation (S12), shifting-up or shifting-down may be performed, and when in response to sensing a positive (+) operation of the paddle switch based on a signal from the gear 11, the vehicle controller 20 may be configured to select and use the regenerative braking torque map for the gear, one step (e.g., level) higher than the current gear (S16 and S17). For example, when the D1-gear is engaged, in response to sensing a positive (+) operation of the paddle switch, the controller may be configured to change the torque map to the regenerative braking torque map for the D2-gear (e.g., changed into the torque map for the D3-gear when the D2-gear is engaged), calculate the regenerative braking torque value that corresponds to the current vehicle speed detected by a vehicle speed detecting unit (e.g., a sensor) from the changed regenerative braking torque map, and adjust the regenerative braking of a motor together with the motor controller 30 based on the calculated torque value.

When the highest gear (e.g., D3-gear) in the manual mode is engaged, the current gear may be maintained and the torque map may remain unchanged (S18 and S19). Alternatively, when the vehicle controller 20 senses a negative (−) operation of the paddle shift based on the signal from the paddle shift 11, the regenerative braking torque map for the gear, one step lower than the current gear, may be selected and used (S14 and S15). For example, with the D3-gear engaged, in response to sensing a negative (−) operation, the vehicle controller may be configured to change the torque map to the regenerative braking torque map of the D2-gear (e.g., to the torque map of the D1-gear, when the D2-gear is engaged), calculate the regenerative braking torque value that corresponds to the current vehicle speed from the changed regenerative braking torque map, and adjust the regenerative braking of the motor based on the calculated torque value. Similarly, when the lowest gear (D0-gear) in the manual mode is engaged, the current gear may be maintained and the torque map may remain unchanged (S13, S18, and S19).

Accordingly, since the regenerative braking torque maps for the gears (D0-~DN-gears) may be selected or changed based on an operation of the paddle shift mounted on the steering wheel, with the shift lever at the D-gear while a vehicle travels, subdivided and different regenerative braking control may be performed at the D-gear (e.g., the amount of generative braking changes for each gear), such that it may be possible to achieve the improved regenerative braking energy. Therefore, it may be possible to increase the amount of recovered energy, improve fuel efficiency, and use the energy of a vehicle more efficiently.

Although exemplary embodiments of the present invention were described in detail above, the scope of the present invention is not limited to the exemplary embodiments and various changes and modifications from the spirit of the present invention defined in the following claims by those skilled in the art are also included in the scope of the present invention. The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A variable control method of the amount of regenerative braking of a vehicle in which a plurality of regenerative braking torque maps divided for gears in a manual mode is set, the method comprising:
    sensing, by a controller, positive (+) and negative (−) shifting in the manual mode based on a signal from a shift-operating unit during regenerative braking with a drive (D) gear engaged while the vehicle travels;
    selecting, by the controller, a regenerative braking torque map that corresponds to a selected gear based on the signal from the shift-operating unit; and
    adjusting, by the controller, regenerative braking of a driving motor based on a torque value calculated from the selected regenerative braking torque map,
    wherein the shift-operating until is a paddle shift mounted on a steering wheel and the plurality of regenerative braking torque maps are subdivided based on a plurality of drive gears D0 to DN for the drive (D) gear being engaged by an operating of a shift lever and selected based on the signal generated by an operation of the paddle shift.

2. The method of claim 1, wherein the regenerative braking torque value increases as the gear increases based on vehicle speed in the regenerative braking torque maps.

3. The method of claim 1, wherein the drive gears are based on the positive and negative shifting while the vehicle travels.

4. A variable control apparatus of the amount of regenerative braking of a vehicle, comprising:
    a shift-operating unit configured to perform positive (+) and negative (−) shifting in a manual mode with a drive (D) gear engaged while the vehicle travels;
    an upper controller configured to:
        sense shifting of the shift-operating unit in the manual mode based on a signal from the shift-operating unit during regenerative braking;
        select a regenerative braking torque map that corresponds to a selected gear; and
        calculate a regenerative braking torque value from the selected regenerative braking torque map; and
    a motor controller configured to receive a torque order that corresponds to the calculated regenerative braking torque value from the upper controller and adjust regenerative braking torque output of a driving motor,
    wherein the shift-operating unit is a paddle shift mounted on a steering wheel,
    wherein a plurality of regenerative braking torque maps are divided for drive gears in the manual mode and the regenerative braking torque map that corresponds to the gear selected by a driver is selectively used to calculate the regenerative braking torque value, and
    wherein the plurality of regenerative braking torque maps are subdivided based on a plurality of drive gears D0 to DN for the drive (D) gear being engaged by an operation of a shift lever and selected based on the signal generated by an operation of the paddle shift.

5. The apparatus of claim 4, wherein the regenerative braking torque value increases as the gear increases based on the vehicle speed in the regenerative braking torque maps.

6. The apparatus of claim 4, wherein the drive gears are based on the positive and negative shifting while the vehicle travels.

7. A non-transitory computer readable medium containing program instructions executed by a controller, the computer readable medium comprising:
    program instructions that control a shift-operating unit to perform positive (+) and negative (−) shifting in a manual mode with a drive (D) gear engaged while the vehicle travels;
    program instructions that sense shifting of the shift-operating unit in the manual mode based on a signal from the shift-operating unit during regenerative braking;
    program instructions that select a regenerative braking torque map that corresponds to a selected gear; and
    program instructions that calculate a regenerative braking torque value from the selected regenerative braking torque map; and
    program instructions that transmit a torque order that corresponds to the calculated regenerative braking torque value to adjust regenerative braking torque output of a driving motor,
    wherein the shift-operating until is a paddle shift mounted on a steering wheel,
    wherein a plurality of regenerative braking torque maps are divided for drive gears in the manual mode and the regenerative braking torque map that corresponds to the gear selected by a driver is selectively used to calculate the regenerative braking torque value, and
    wherein the plurality of regenerative braking torque maps are subdivided based on a plurality of drive gears D0 to DN for the drive (D) gear being engaged by an operation of a shift lever and selected based on the signal generated by an operation of the paddle shift.

8. The non-transitory computer readable medium of claim 7, wherein the regenerative braking torque value increases as the gear increases based on the vehicle speed in the regenerative braking torque maps.

9. The non-transitory computer readable medium of claim 7, wherein the drive gears are based on the positive and negative shifting while the vehicle travels.

* * * * *